(12) United States Patent
Otsuki

(10) Patent No.: US 8,577,142 B2
(45) Date of Patent: *Nov. 5, 2013

(54) IMAGE PROCESSING DEVICE, IMAGE PROCESSING METHOD AND PROGRAM WITH IMPROVED IMAGE CONTRAST

(75) Inventor: Seichi Otsuki, Kanagawa (JP)

(73) Assignee: Sony Corporation (JP)

( * ) Notice: Subject to any disclaimer, the term of this patent is extended or adjusted under 35 U.S.C. 154(b) by 127 days.

This patent is subject to a terminal disclaimer.

(21) Appl. No.: 12/931,108

(22) Filed: Jan. 25, 2011

(65) Prior Publication Data

US 2011/0194766 A1 Aug. 11, 2011

(30) Foreign Application Priority Data

Feb. 10, 2010 (JP) ................ P2010-028040

(51) Int. Cl.
*G06K 9/38* (2006.01)
*G06K 9/00* (2006.01)

(52) U.S. Cl.
USPC ........................................... 382/172

(58) Field of Classification Search
USPC ......... 382/162, 164, 168, 172, 190, 218–220, 382/284; 348/222.1, 223.1, 229.1, 230.1, 348/362, 364, E05.037; 345/87, 102, 204, 345/690; 358/522, 530
See application file for complete search history.

(56) References Cited

U.S. PATENT DOCUMENTS

| | | | | | |
|---|---|---|---|---|---|
| 5,042,077 | A | * | 8/1991 | Burke | 382/169 |
| 7,006,668 | B2 | * | 2/2006 | Iguchi et al. | 382/108 |
| 7,612,758 | B2 | * | 11/2009 | Yang | 345/102 |
| 7,944,485 | B2 | * | 5/2011 | Ovsiannikov | 348/229.1 |
| 8,009,224 | B2 | * | 8/2011 | Umeda | 348/362 |
| 2010/0328491 | A1 | * | 12/2010 | Ovsiannikov | 348/229.1 |
| 2011/0142342 | A1 | * | 6/2011 | Otsuki et al. | 382/172 |
| 2011/0194766 | A1 | * | 8/2011 | Otsuki | 382/168 |

OTHER PUBLICATIONS

"Fast Bilateral Filtering for the Display of High-Dynamic-Range Images", Durand et al., SIGGRAPH '02: Proceedings of the 29th Annual Conference on Computer Graphics and Interactive Techniques (2002), pp. 257-266.

* cited by examiner

*Primary Examiner* — Amir Alavi

(74) *Attorney, Agent, or Firm* — Lerner, David, Littenberg, Krumholz & Mentlik, LLP

(57) ABSTRACT

An image processing device calculates a frequency of a pixel value for each block, generates a first histogram formed by N bins, mixes the first histogram of a high luminance block and the first histogram of each block, and thereby generates a second histogram for each block. Based on the second histograms of a block including a target pixel and an adjacent block, a frequency of a pixel value that depends on a pixel position in the block of the target pixel is calculated, and a third histogram is generated for each pixel. A relationship between the pixel value and an output value of the pixel value is generated based on the third histogram such that a maximum cumulative frequency of the third histogram matches a maximum value of the output value of the pixel value, and the output value is calculated from the pixel value of the target pixel.

7 Claims, 13 Drawing Sheets

IMAGE PROCESSING DEVICE, IMAGE PROCESSING METHOD AND PROGRAM WITH IMPROVED IMAGE CONTRAST

CROSS-REFERENCE TO RELATED APPLICATION

The present application claims priority from Japanese Patent Application No. JP 2010-028040 filed in the Japanese Patent Office on Feb. 10, 2010, the entire content of which is incorporated herein by reference.

BACKGROUND OF THE INVENTION

1. Field of the Invention

The present invention relates to an image processing device, an image processing method and a program.

2. Description of the Related Art

If an imaging device with a lighting device, such as a video camera, is used for image capture and an image is displayed on a display, a part where illumination light reaches and a surrounding dark part where illumination light does not reach are generated as shown in FIG. 6A. If a subject, such as a person, is near to the imaging device in an image capture environment at night-time or the like (namely, in a dark place), a subject image is blown out and appears white (in other words, highlight clipping occurs) due to reflection of the illumination light. FIG. 6A and FIG. 6B are explanatory diagrams each showing an example of an image.

In order to improve contrast of a part with a small luminance difference, such as a region formed by high luminance pixels where highlights are almost blown-out, tone correction is generally performed on an image. A known technology relating to tone correction is described, for example, in "Frédo Durand and Julie Dorsey, Fast Bilateral Filtering for the Display of High-Dynamic-Range Images, in SIGGRAPH '02: Proceedings of the 29th annual conference on computer graphics and interactive techniques (2002), pp. 257-266". In the technology described in "Fast Bilateral Filtering for the Display of High-Dynamic-Range Images", tone correction is performed on an image for each region or each pixel of the image.

SUMMARY OF THE INVENTION

The tone correction in image processing is performed by linear processing such as gain adjustment, gamma correction or the like.

In the tone correction performed by linear processing such as gain adjustment, gamma correction or the like, if an adjustment is performed on an image with a large brightness difference in order to improve the contrast of a dark part, the contrast of a bright part is impaired. On the other hand, if an adjustment is performed to improve the contrast of the bright part, the contrast of the dark part is impaired.

Further, when the tone correction is performed for each region or each pixel as described in "Fast Bilateral Filtering for the Display of High-Dynamic-Range Images, in SIGGRAPH '02: Proceedings of the 29th annual conference on computer graphics and interactive techniques (2002), pp. 257-266", generally, significantly large hardware and software resources are required.

In a monitoring system in which a security camera is used, for example, it is important to improve visibility of a subject that is located near to the imaging device and that is irradiated by illumination light. However, even if the normal tone correction by linear processing such as gain adjustment, gamma correction or the like is performed, a person and the like located near to the imaging device remain blown out in the image, and the subject image cannot be visually recognized in a reliable manner.

In light of the foregoing, it is desirable to provide an image processing device, an image processing method and a program that are novel and improved and that are capable of improving the contrast of an image of a subject that is located near to an imaging device and that is irradiated by illumination light, as well as being capable of reducing a circuit load.

According to an embodiment of the present invention, there is provided an image processing device includes a block histogram generation potion, a pixel histogram generation portion and an output value determination portion. The block histogram generation potion calculates a frequency of a pixel value for each of blocks formed of a plurality of pixels, divides a dynamic range into N ranges (where N is an integer larger than one), generates a first histogram formed by N bins in which a width of one bin corresponds to a plurality of pixel values, extracts the first histogram of a high luminance block formed by pixels having a high luminance value from among the plurality of blocks of an entire image, mixes the first histogram of each of the blocks and the first histogram of the high luminance block, and generates a second histogram for each of the blocks. The pixel histogram generation portion, based on the second histogram of a block including a target pixel and the second histogram of a block adjacent to the block including the target pixel, calculates a frequency of a pixel value that depends on a pixel position in the block of the target pixel, and generates a third histogram formed by N bins for each pixel. The output value determination portion generates a relationship between the pixel value and an output value of the pixel value based on the third histogram such that a maximum cumulative frequency of the third histogram matches a maximum value of the output value of the pixel value, and calculates the output value from the pixel value of the target pixel.

In this configuration, the block histogram generation portion applies weighting to the frequency in accordance with the pixel value.

In this configuration, the block histogram generation portion adds, in accordance with the pixel value, the frequency to a bin adjacent to a bin including the pixel value.

In this configuration, the pixel histogram generation portion mixes the second histogram of the block including the target pixel and the second histogram of the block adjacent to the block including the target pixel, by normalizing the second histograms by a distance between the target pixel and a center of the adjacent block, and generates the third histogram.

In this configuration, the relationship between the pixel value and the output value of the pixel value is obtained by connecting lines, each of which is formed by connecting a frequency of a minimum pixel value of one bin width to a frequency of a maximum pixel value of one bin width.

According to another embodiment of the present invention, there is provided an image processing method includes the steps of calculating a frequency of a pixel value for each of blocks formed of a plurality of pixels, dividing a dynamic range into N ranges (where N is an integer larger than one), and generating a first histogram formed by N bins in which a width of one bin corresponds to a plurality of pixel values, extracting the first histogram of a high luminance block formed by pixels having a high luminance value from among the plurality of blocks of an entire image, mixing the first histogram of each of the blocks and the first histogram of the high luminance block, and generating a second histogram for each of the blocks, calculating, based on the second histogram of a block including a target pixel and the second histogram of a block adjacent to the block including the target pixel, a frequency of a pixel value that depends, on a pixel position in the block of the target pixel, and generating a third histogram formed by N bins for each pixel, and generating a relationship between the pixel value and an output value of the pixel value based on the third histogram such that a maximum cumulative frequency of the third histogram matches a maximum value of the output value of the pixel value, and calculating the output value from the pixel value of the target pixel.

According to another embodiment of the present invention, there is provided a program that includes instructions that command a computer to function as a first histogram generation unit that calculates a frequency of a pixel value for each of blocks formed of a plurality of pixels, divides a dynamic range into N ranges (where N is an integer larger than one), and generates a first histogram formed by N bins in which a width of one bin corresponds to a plurality of pixel values, an extraction unit that extracts the first histogram of a high luminance block formed by pixels having a high luminance value from among the plurality of blocks of an entire image, a second histogram generation unit that mixes the first histogram of each of the blocks and the first histogram of the high luminance block, and generates a second histogram for each of the blocks, a third histogram generation unit that, based on the second histogram of a block including a target pixel and the second histogram of a block adjacent to the block including the target pixel, calculates a frequency of a pixel value that depends on a pixel position in the block of the target pixel, and generates a third histogram formed by N bins for each pixel, and an output value determination unit that generates a relationship between the pixel value and an output value of the pixel value based on the third histogram such that a maximum cumulative frequency of the third histogram matches a maximum value of the output value of the pixel value, and calculates the output value from the pixel value of the target pixel.

According to the present invention described above, it is possible to improve the contrast of an image of a subject that is located near to an imaging device and that is irradiated by illumination light, and it is also possible to reduce a circuit load.

DETAILED DESCRIPTION OF THE EMBODIMENT(S)

Figure 1:
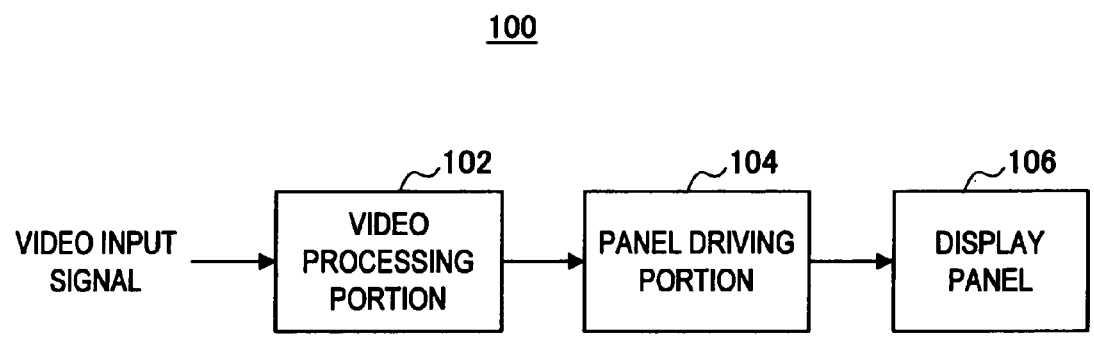
FIG. 1 is a block diagram showing a display device 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
 1. Configuration of Embodiment
 2. Operations of Embodiment
1. Configuration of Embodiment First, a display device 100 according to an embodiment of the present invention will be explained with reference to FIG. 1. FIG. 1 is a block diagram showing the display device 100 according to the present embodiment.

The display device 100 is, for example, a television receiver, a monitor or the like. As shown in FIG. 1, the display device 100 includes, for example, a video processing portion 102, a panel driving portion 104 and a display panel 106.

The video processing portion 102 receives a video input signal and performs image processing on the video input signal, thereby generating a display signal. The image processing includes, for example, tone correction, contour detection, smoothing processing and the like. The video processing portion 102 is an example of an image processing device.

The panel driving portion 104 receives the display signal generated by the video processing portion 102 and generates a driving signal.

The display panel 106 is, for example, a liquid crystal display panel, an organic EL display panel or the like. The display panel 106 displays an image on a screen based on the driving signal generated by the panel driving portion 104. A plurality of pixels are arranged in a matrix manner on the display panel 106.

Figure 2:
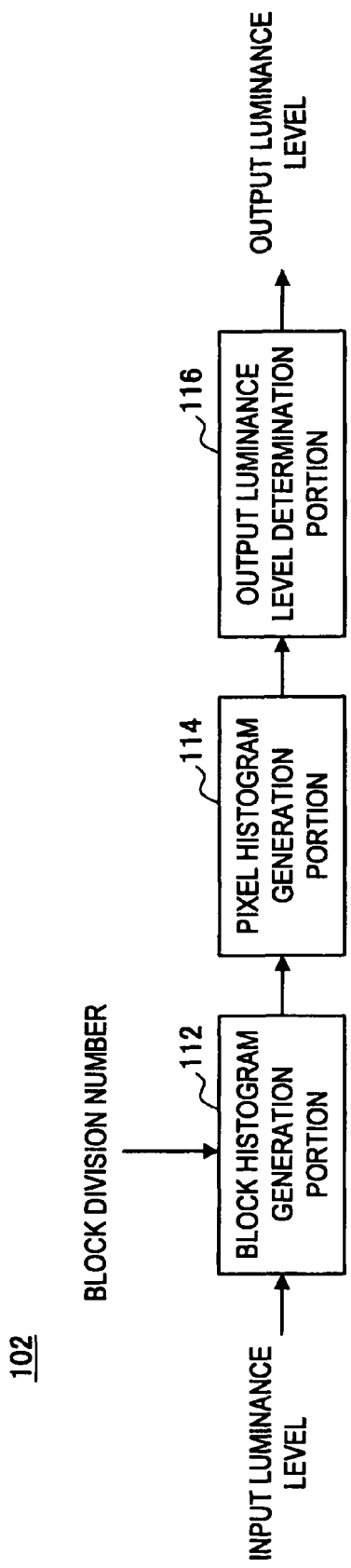
FIG. 2 is a block diagram showing a video processing portion 102 according to the embodiment.

Next, the video processing portion 102 according to the present embodiment will be explained with reference to FIG. 2. FIG. 2 is a block diagram showing the video processing portion 102 according to the present embodiment.

In an image that is captured by directing illumination light onto a subject in a dark image capture environment, the video processing portion 102 improves visibility of a subject image, such that the subject image, which strongly reflects the illumination light and is bright in the image, is not blown out.

The video processing portion 102 includes a block histogram generation portion 112, a pixel histogram generation portion 114, an output luminance level determination portion 116 and the like.

A luminance value (an input luminance level) of the video input signal is input for each pixel to the block histogram generation portion 112. The luminance value is an example of a pixel value. Further, a division number to divide one image into blocks is input to the block histogram generation portion 112. Each block is a group of a plurality of pixels. The size of the block is an area of about one to two percent of the entire image, for example. Note that the size of the block can be changed in accordance with hardware, such as a memory, that is provided in the display device 100.

Figure 7:
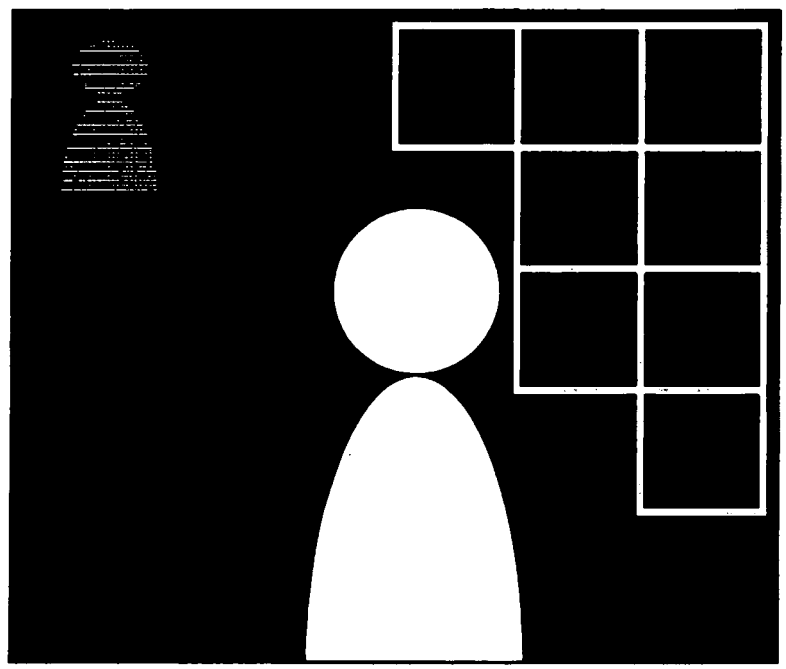
FIG. 7 is an explanatory diagram showing image division.

As shown in FIG. 7, the block histogram generation portion 112 divides the entire image into a plurality of blocks, based on the division number. FIG. 7 is an explanatory diagram showing image division. The block histogram generation portion 112 counts a frequency of the luminance values for each block and thereby generates a histogram of each block. At this time, the block histogram generation portion 112 divides a dynamic range of the luminance values into N ranges (where N is an integer larger than one) and thereby generates a first cumulative histogram. Namely, the width of one bin of the first cumulative histogram corresponds to a plurality of luminance values, and the first cumulative histogram is formed by N bins. The first cumulative histogram is an example of a first histogram.

Figure 9:
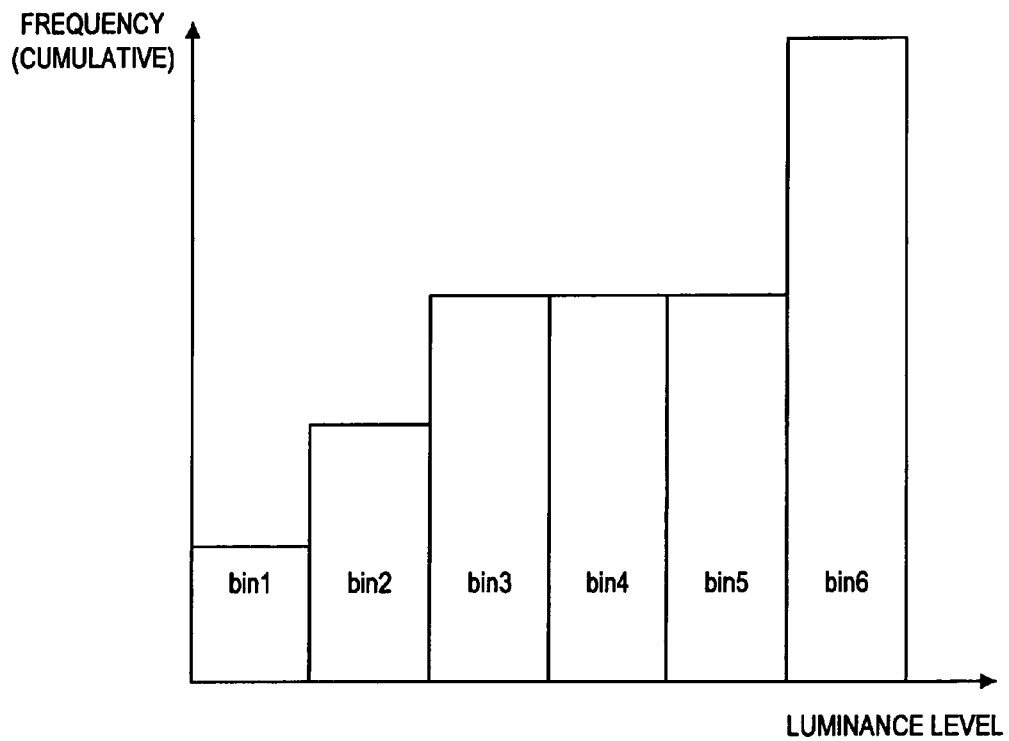
FIG. 9 is a graph showing a first cumulative histogram.

FIG. 9 shows the first cumulative histogram in which the luminance values (the luminance levels) are divided into six bins. FIG. 9 is a graph showing the first cumulative histogram. A division number N of the dynamic range of the luminance values can be changed in accordance with hardware, such as a memory, that is provided in the display device 100. Further, the division number N is determined in accordance with the extent of the dynamic range. If the width of one bin of the first cumulative histogram is based on a logarithm, it is possible to easily include a wide dynamic range that is represented using an index.

When the block histogram generation portion 112 generates the first cumulative histogram, it applies weighting to the frequency in accordance with the luminance value. Further, the block histogram generation portion 112 adds a frequency also to surrounding bins (adjacent bins, for example) in accordance with the luminance value. In a case where the width of each bin is wide, if the frequency of the luminance value is concentrated in the vicinity of a boundary between a certain bin and the adjacent bins, a tone curve (which will be described later) is not generated appropriately. Even when each bin has a certain width, it is possible to disperse the frequency by adding the frequency also to the surrounding bins in accordance with the luminance value. Thus, an appropriate tone curve can be generated.

The block histogram generation portion 112 extracts the brightest block from among the plurality of blocks included in the image. Here, the extracted block is also referred to as a high luminance block. Then, the block histogram generation portion 112 mixes the first cumulative histogram of each block and the first cumulative histogram of the high luminance block, and thereby generates a second cumulative histogram for each of the blocks. The second cumulative histogram is an example of a second histogram. As a result, the entire image has a tone such that the "brightest region" is given priority.

The pixel histogram generation portion 114 mixes the second cumulative histogram of a block that includes a target pixel and the second cumulative histogram of a surrounding block, and thereby generates a third cumulative histogram for each pixel. The third cumulative histogram is an example of a third histogram. The third cumulative histogram includes N bins, where N is the same number as that of the first cumulative histogram.

When the third cumulative histogram is generated by mixing the second cumulative histograms, the third cumulative histogram is calculated depending on a pixel position in the block of the target pixel. Thus, it is possible to prevent a situation in which the luminance values are unnaturally discontinuous between the target pixel and adjacent pixels.

Figure 13:
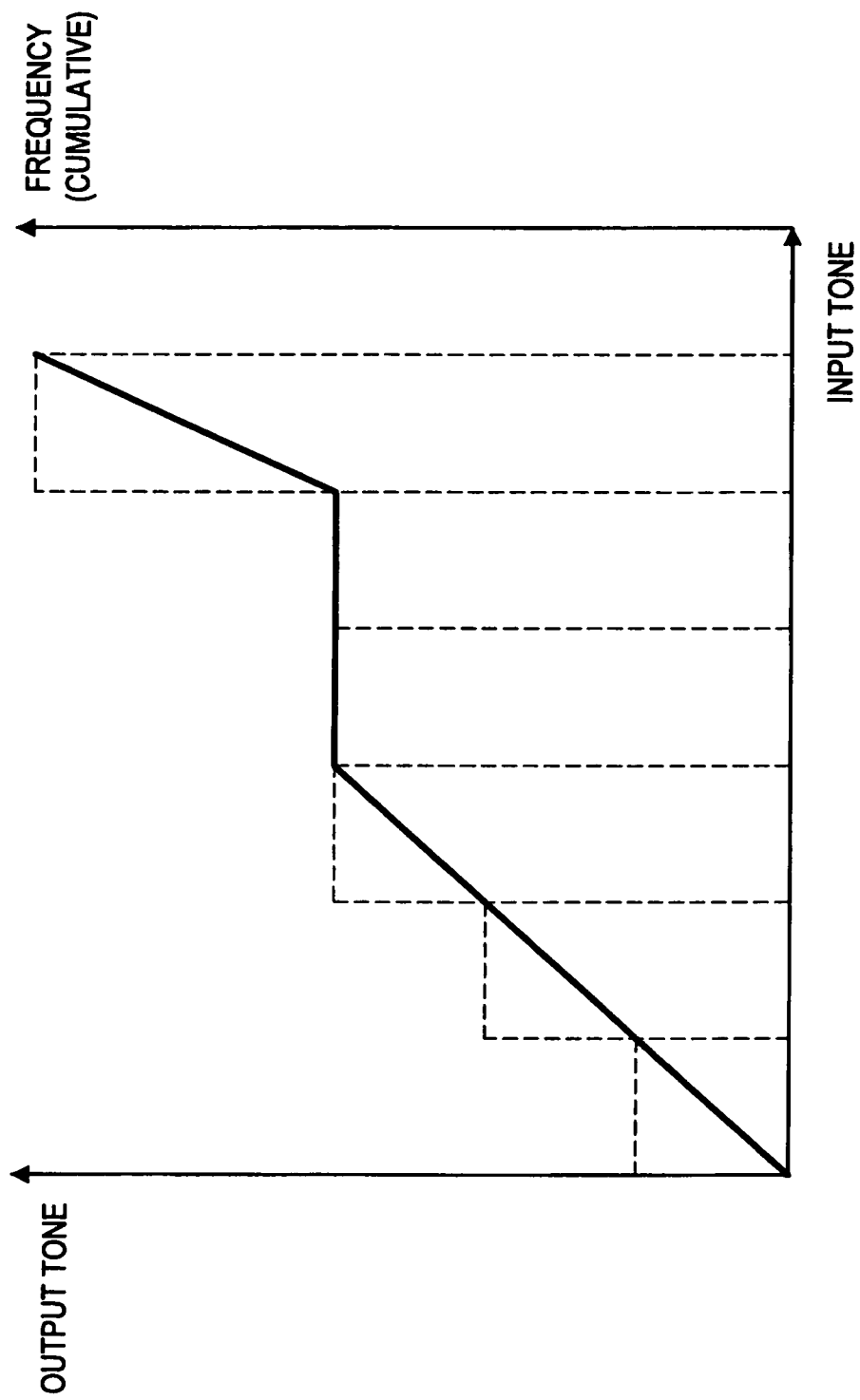
FIG. 13 is a graph showing a tone curve and a cumulative histogram.

Based on the third cumulative histogram generated for each pixel, the output luminance level determination portion 116 generates a relationship (a tone curve) between an input luminance value and an output luminance value for each pixel. Then, based on the tone curve generated for each pixel, the output luminance level determination portion 116 determines, for each pixel, the output luminance value from the input luminance value. When the tone curve is generated, a maximum cumulative frequency of the third cumulative histogram, i.e., the number of pixels in the entire image, is caused to match a maximum value of the output luminance value, as shown in FIG. 13. Then, the output luminance value is assigned in accordance with a frequency value of each bin of the third cumulative histogram.

As a result, as shown in FIG. 13, in a range of the input luminance value in which there is no pixel, the tone curve is flat, while in a range of the input luminance value in which there are pixels, the tone curve is linear, for example. FIG. 13 is a graph showing the tone curve and the cumulative histogram. As shown in FIG. 13, the tone curve is formed such that a cumulative frequency at a minimum pixel value in each bin range is connected to a cumulative frequency at a maximum pixel value in each bin range to form a line of each of the bins, and then the lines of all the bins are connected. The output luminance level determination portion 116 determines the output luminance values of all the pixels, and thus an image is generated that is formed by the output luminance values that have been tone-converted with respect to the input luminance values.

2. Operations of Embodiment

Figure 3:
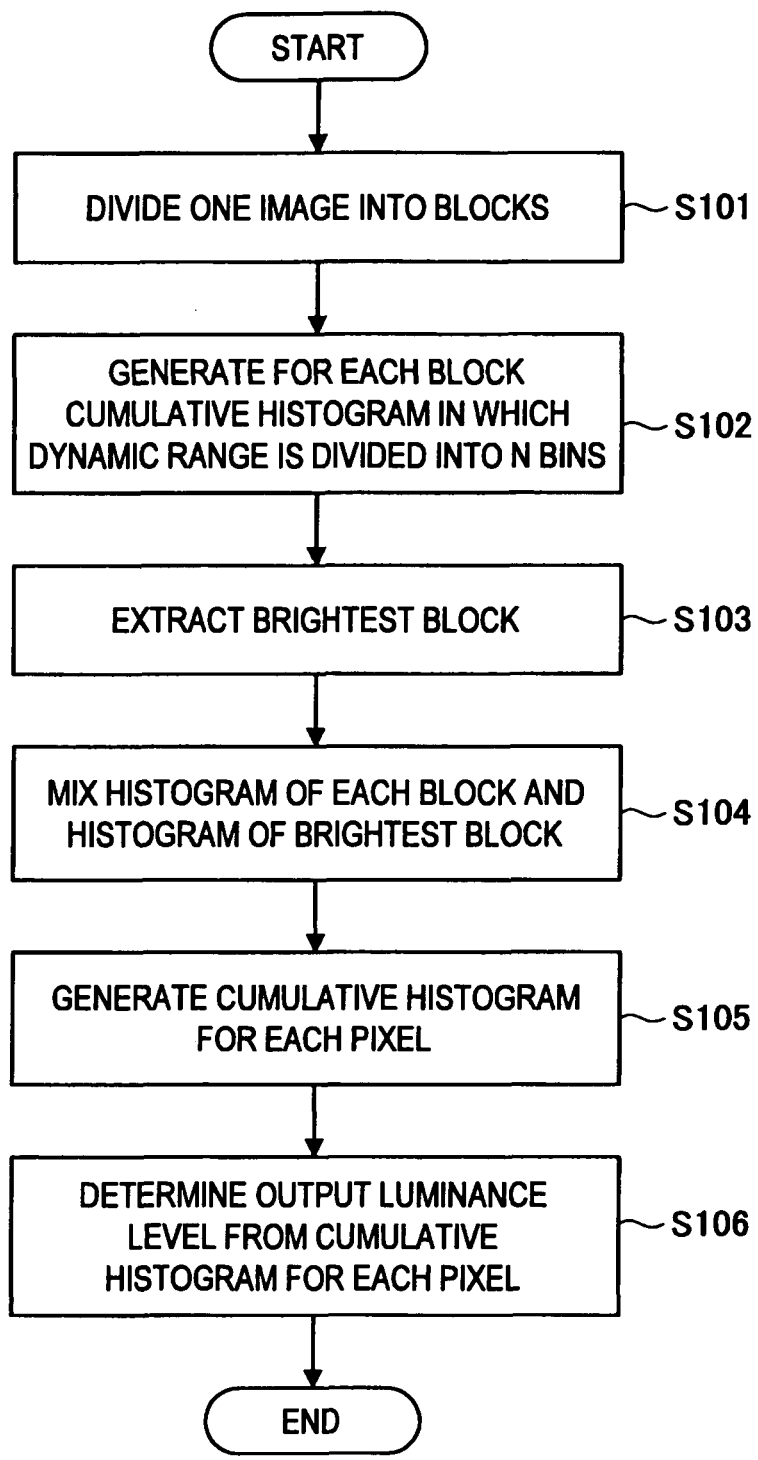
FIG. 3 is a flowchart showing tone conversion processing of the video processing portion 102 according to the embodiment.

Next, tone conversion processing operations according to the present embodiment will be explained with reference to FIG. 3. FIG. 3 is a flowchart showing tone conversion processing of the video processing portion 102 according to the present embodiment. In the present embodiment, an explanation will be given, particularly, for a case in which an image captured by directing illumination light onto a subject in a dark image capture environment is processed. Here, the image is, for example, an infrared image obtained by capturing infrared light, and the illumination light is infrared light irradiated onto the subject. Note that the image is not limited to an infrared image and may be a visible light image, and visible light may be irradiated instead of infrared light.

First, as shown in FIG. 7, one image is divided into a plurality of blocks (step S101). The division number is a value determined in advance.

Next, in each of the blocks, the first cumulative histogram is generated such that the dynamic range of the luminance values is divided into N bins, as shown in FIG. 9 (step S102). At this time, the frequency value is weighted in accordance with the luminance value. First cumulative histogram generation processing that includes weighting processing will be described later.

Figure 11:
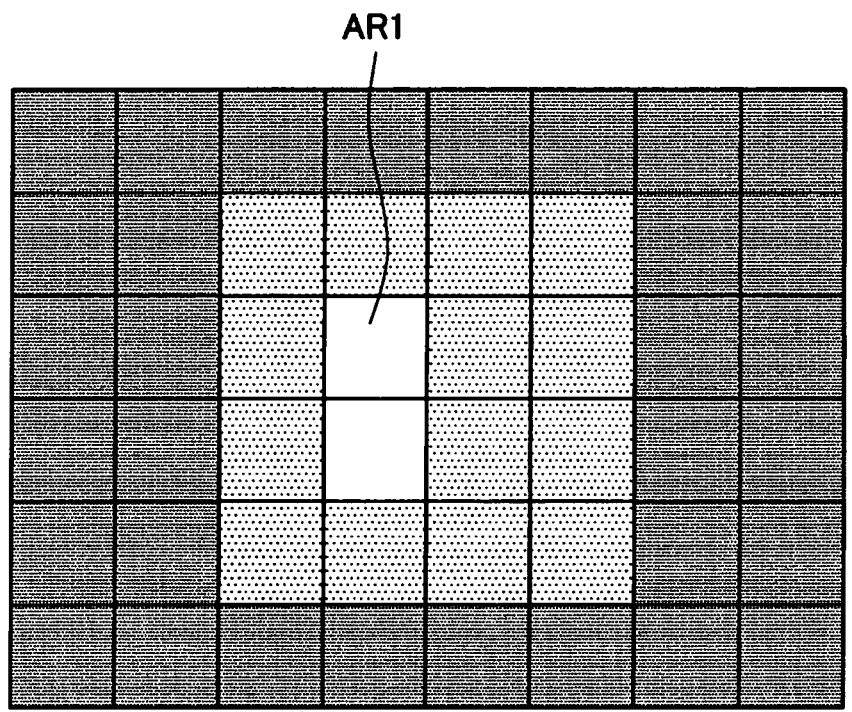
FIG. 11 is an explanatory diagram showing luminance distribution of each block in an image.

Then, the brightest block is extracted from among the plurality of blocks (step S103). In a case where the subject is captured by irradiating infrared light onto the subject, normally, the importance of visibility of a bright region in the image is highest, as shown by AR1 in FIG. 11. The brightness of the block is determined based on, for example, an average value of the luminance values of a plurality of pixels included in the block. Here, the extracted block is also referred to as a high luminance block. The extraction of a bright block is not limited to the extraction of the highest luminance block, and a high luminance block having a luminance close to that of the highest luminance block may be extracted.

Next, the first cumulative histogram of each of the blocks and the first cumulative histogram of the high luminance block is mixed and thereby generates the second cumulative histogram for each of the blocks (step S104). As a result, making use of information of the infrared light irradiated area AR1, the entire image has a tone such that the "brightest region" is given priority.

Figure 12A:
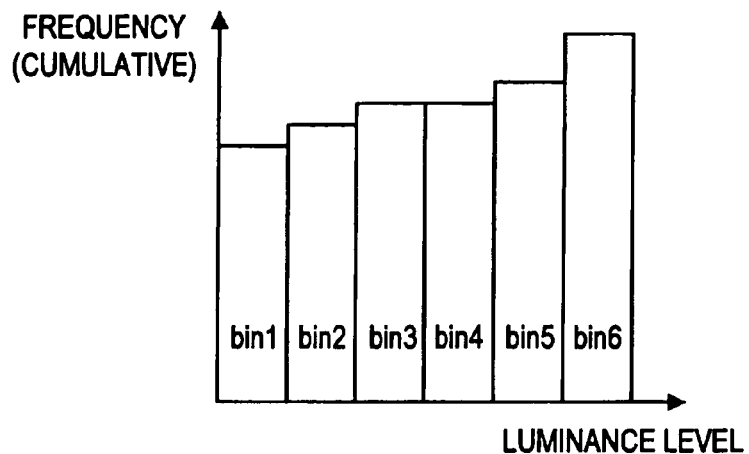
FIG. 12A to FIG. 12C are graphs each showing a histogram.
Figure 12B:
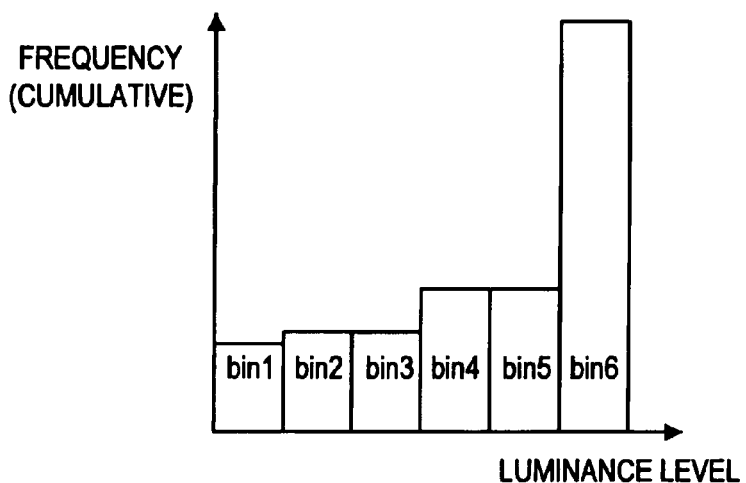
Figure 12C:
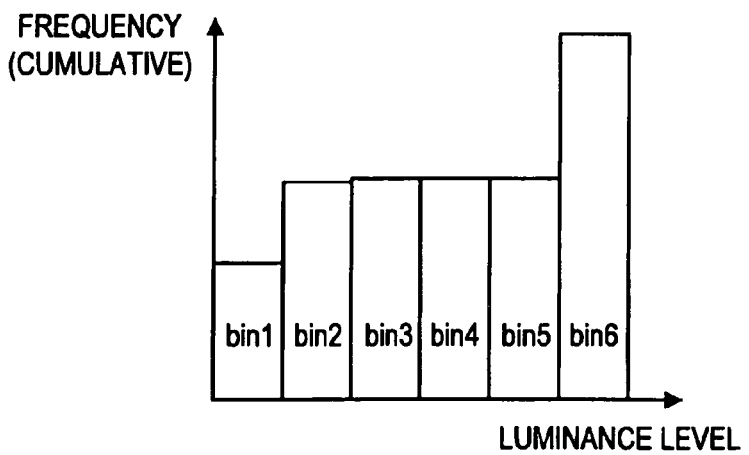

FIG. 12A to FIG. 12C each show an example of mixing of cumulative histograms. FIG. 12A to FIG. 12C are graphs each showing a histogram. FIG. 12A shows the first cumulative histogram of a certain block. FIG. 12B shows the first cumulative histogram of the high luminance block. FIG. 12C shows the second cumulative histogram obtained by mixing the first cumulative histograms. A case is assumed in which the first cumulative histogram is obtained as shown in FIG. 12A in a certain block other than the infrared light irradiated area AR1, and the first cumulative histogram is obtained shown in FIG. 12B in the brightest block. In this case, by mixing the first cumulative histogram of the certain block other than the infrared light irradiated area AR1 and the first cumulative histogram of the high luminance block, the second cumulative histogram of the certain block other than the infrared light irradiated area AR1 is generated as shown in FIG. 12C. In a similar manner, the second cumulative histograms can be generated in all the blocks.

After that, the second cumulative histogram of a block that includes a target pixel and the second cumulative histogram of a surrounding block are mixed, and the third cumulative histogram is generated for each pixel (step S105). When the second cumulative histogram of the block that includes the target pixel and the second cumulative histogram of the surrounding block are mixed, the third cumulative histogram is calculated depending on a pixel position in the block of the target pixel. Third cumulative histogram generation processing will be described later.

Finally, based on the third cumulative histogram generated for each pixel, a relationship (a tone curve) between an input luminance value and an output luminance value is generated for each pixel, and the output luminance value is determined from the input luminance value of each pixel (step S106). By determining the output luminance values of all the pixels, an image is generated that is formed by the output luminance values that have been tone-converted with respect to the input luminance values.

Figure 6A:
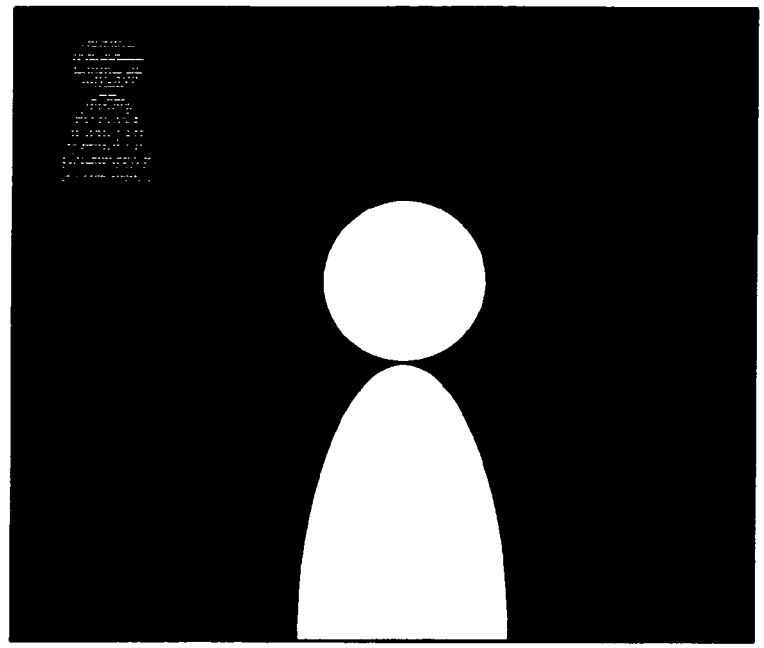
FIG. 6A and FIG. 6B are explanatory diagrams each showing an example of an image.
Figure 6B:
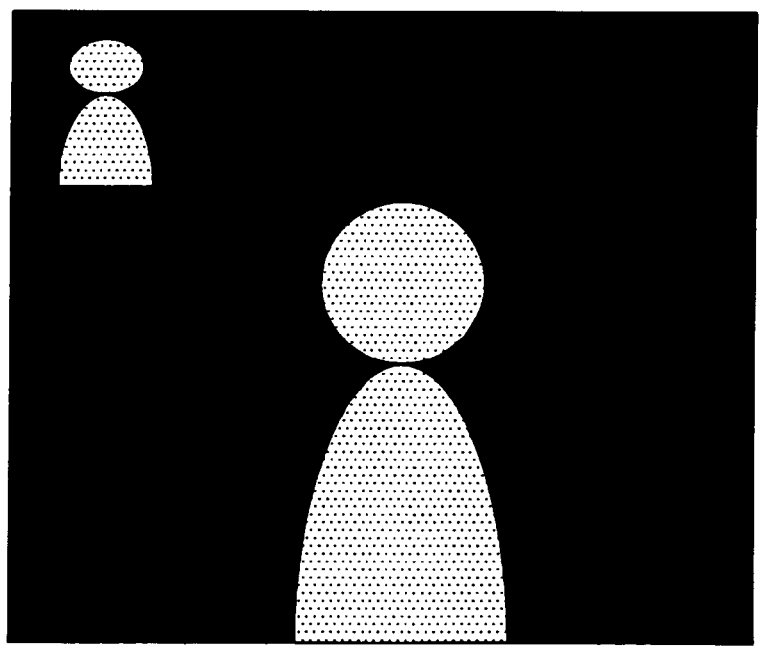

According to the series of tone conversion processing operations described above, in the image that is captured by directing illumination light onto a subject in a dark image capture environment, the video processing portion 102 inhibits the subject that reflects the illumination light from being blown out. Therefore, the display device 100 can display an image that is excellent in terms of visibility, for a region of pixels having a luminance value that is close to highlight clipping, as shown in FIG. 6B, for example. Further, in the tone conversion processing of the present embodiment, although the output luminance value is determined for each pixel, a histogram is generated for each block or a histogram is generated using a small number of bins, unlike the method described in "Fast Bilateral Filtering for the Display of High-Dynamic-Range Images, in SIGGRAPH '02: Proceedings of the 29th annual conference on computer graphics and interactive techniques (2002), pp. 257-266". As a result, the tone conversion processing of the present embodiment can reduce a circuit load and it can be achieved using very few resources.

Weighting Processing

Figure 4:
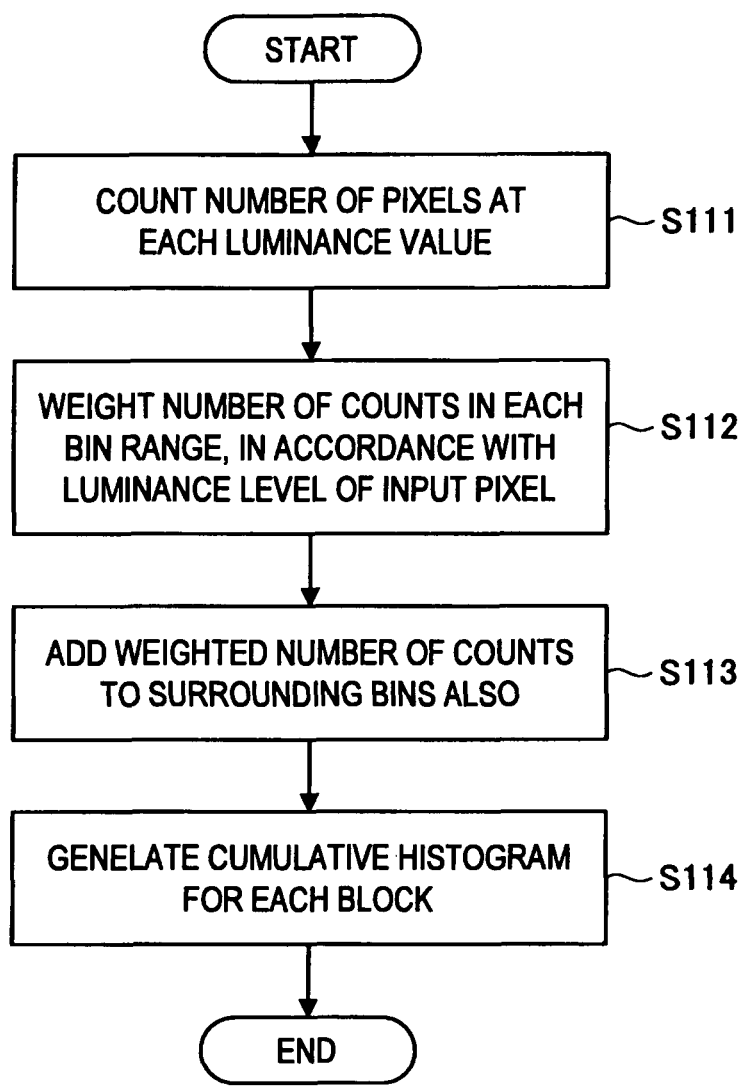
FIG. 4 is a flowchart showing cumulative histogram generation processing for each block according to the embodiment.

Next, weighting processing according to the present embodiment will be explained with reference to FIG. 4. FIG. 4 is a flowchart showing cumulative histogram generation processing for each block according to the present embodiment.

First, the number of pixels at each luminance value is counted for each of the blocks (step S111). The number of pixels at each luminance value is added to one of N bins. When the first cumulative histogram is generated, the frequency (the number of counts) is weighted in each bin range, in accordance with the input luminance value (step S112).

Figure 8:
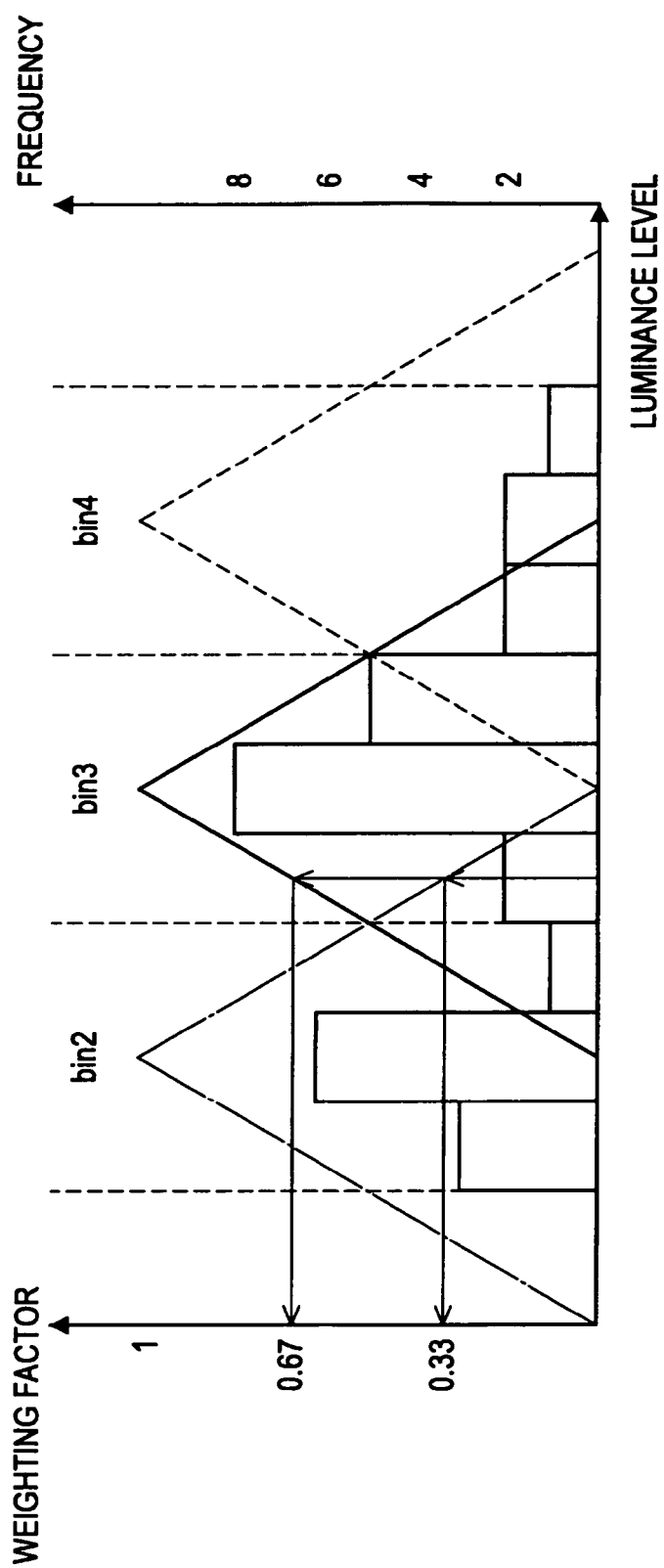
FIG. 8 is a graph showing a relationship between a weighting factor and a luminance level, and a histogram.

FIG. 8 is a graph showing a relationship between a weighting factor and a luminance level, and a histogram. The histogram shown in FIG. 8 indicates a case in which the width of one bin corresponds to three luminance values. As shown in FIG. 8, the weighting factor for the luminance value positioned at the center in each bin range is 1, and the weighting factor for the luminance value positioned at the left end or the right end in each bin range is 0.67. The weighted frequency is a value obtained by multiplying the frequency of a certain luminance value by the weighting factor.

With respect to the luminance value positioned in the vicinity of a boundary between the respective bins, the frequency of the luminance value is added also to adjacent bins (step S113). For example, in FIG. 8, at the luminance value positioned in the vicinity of the boundary between the bins, the frequency is multiplied by a weighting factor of 0.33. Then, the weighted frequency is added to the adjacent bins.

According to the series of operations described above, the first cumulative histogram such as that shown in FIG. 9 is generated for each of the blocks (step S114). Note that the width of each bin of the histogram shown in FIG. 8 is only an example, and the width of each bin may correspond to m luminance values (where m is an integer other than three). The value of the weighting factor can be determined in accordance with the width of each bin or the like. Further, the weighted frequency may be added not only to adjacent bins, but also to, surrounding bins between which there are one or more bins.

Third Cumulative Histogram Generation Processing

Figure 5:
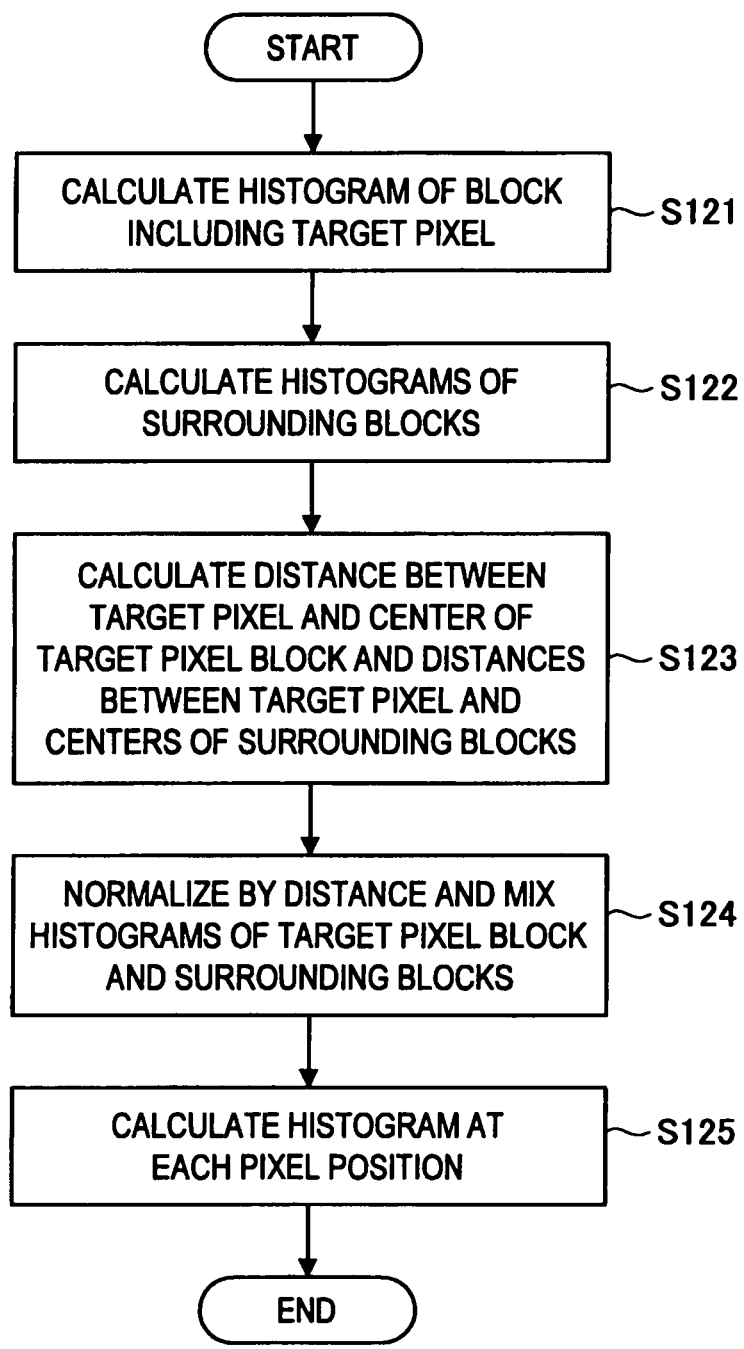
FIG. 5 is a flowchart showing cumulative histogram generation processing for each pixel according to the embodiment.

Next, the third cumulative histogram generation processing according to the present embodiment will be explained with reference to FIG. 5. FIG. 5 is a flowchart showing cumulative histogram generation processing for each pixel according to the present embodiment.

First, the second cumulative histogram of a block that includes a pixel (hereinafter also referred to as a target pixel) for which a cumulative histogram is to be generated is calculated (step S121). The second cumulative histogram is calculated, for example, by step S101 to step S104 that are explained with reference to FIG. 3. Next, the second cumulative histograms of surrounding blocks, such as blocks adjacent to the block that includes the target pixel are calculated (step S122).

Figure 10:
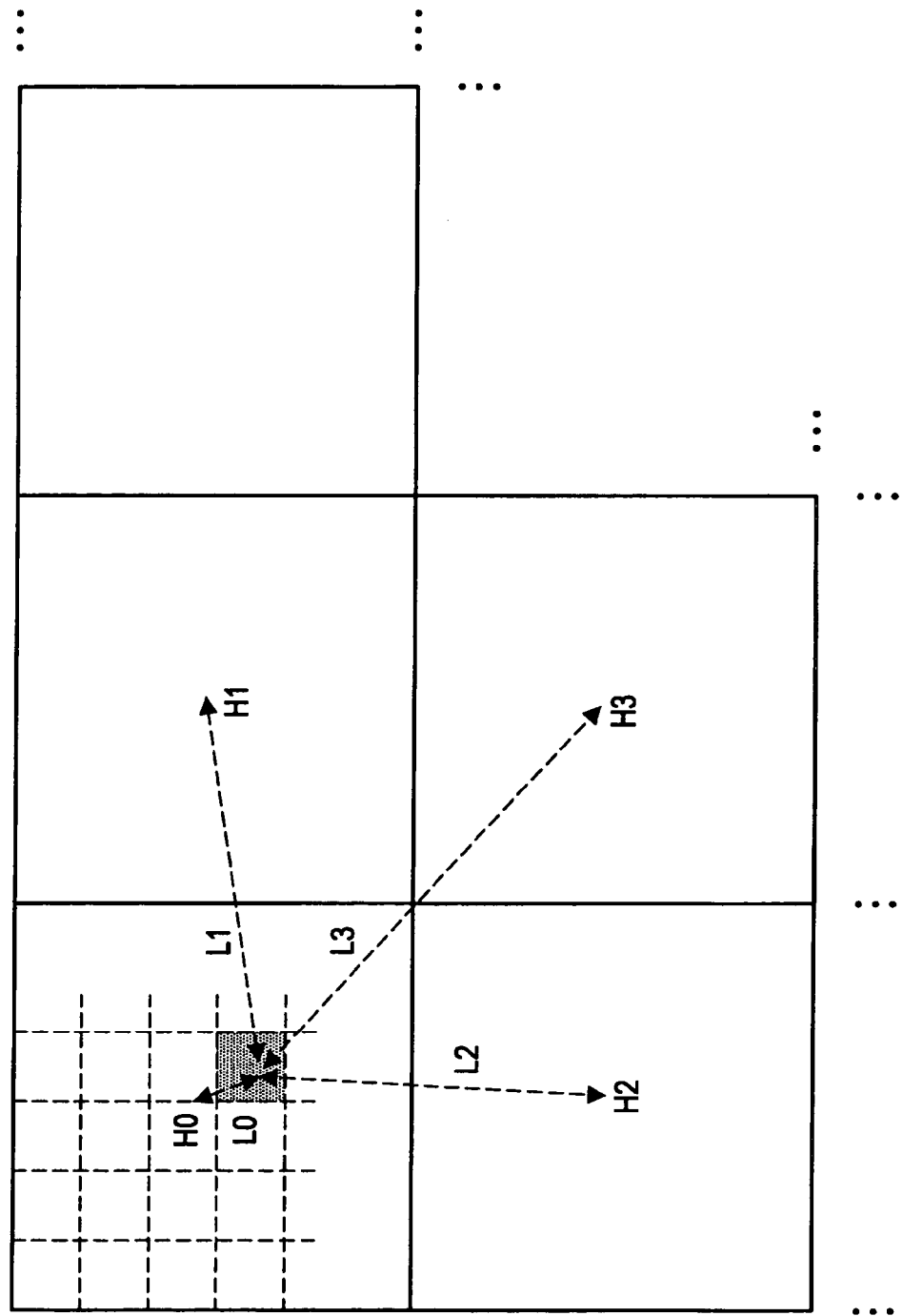
FIG. 10 is an explanatory diagram schematically showing pixels and blocks in an image.

Then, as shown in FIG. 10, a distance between the target pixel and the center of the block including the target pixel, and distances between the target pixel and the centers of the surrounding blocks are calculated (step S123). FIG. 10 is an explanatory diagram schematically showing pixels and blocks in an image. In FIG. 10, a hatched pixel is the target pixel, the distance between the target pixel and the center of the block including the target pixel is denoted by L0, and the distances between the target pixel and the centers of the surrounding blocks are denoted by L1, L2 and L3.

Next, the second cumulative histogram of the block including the target pixel and the second cumulative histograms of the surrounding blocks are normalized by the distance and mixed for each pixel (step S124). If the histogram of the block including the target pixel is denoted by H0 and the histograms of the surrounding blocks are denoted by H1, H2 and H3, a histogram H that is generated for each target pixel is denoted by the following formula. The following formula shows a case in which the target pixel shown in FIG. 10 is (i, j)=(4, 4).

$$H(4,4)=(H0/L0+H1/L1+H2/L2+H3/L3)/(1/L0+1/L1+1/L2+1/L3)$$

As a result, the second cumulative histogram of the block including the target pixel and the second cumulative histograms of the surrounding blocks are normalized by the distance and mixed, and the cumulative histogram at each pixel position is generated (step S125). In other words, the frequency of the pixel value that depends on the pixel position in the block of the target pixel is calculated, and the cumulative histogram is calculated for each pixel.

In the known technology, when the tone correction is performed for each region or each pixel, generally, significantly large hardware and software resources are required. In contrast, according to the present embodiment, in an infrared image that is captured by directing infrared light onto a subject in a dark image capture environment, the infrared light is strongly reflected and a subject image that is bright in the image is inhibited from being blown out. As a result, the display device 100 improves visibility of the subject image as shown in FIG. 6B, for example. Further, in the tone conversion processing of the present embodiment, although the output luminance value is determined for each pixel, a histogram is generated for each block or a histogram is generated using a small number of bins. Thus, in contrast to the known technology, the tone conversion processing of the present embodiment can reduce a circuit load and it can be achieved using very few resources.

The exemplary embodiment of the present embodiment is described above in detail with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a block histogram generation portion that calculates a frequency of a pixel value for each of blocks formed of a plurality of pixels, divides a dynamic range into N ranges (where N is an integer larger than one), generates a first histogram formed by N bins in which a width of one bin corresponds to a plurality of pixel values, extracts the first histogram of a high luminance block formed by pixels having a high luminance value from among the plurality of blocks of an entire image, mixes the first histogram of each of the blocks and the first histogram of the high luminance block, and generates a second histogram for each of the blocks;
a pixel histogram generation portion that, based on the second histogram of a block including a target pixel and the second histogram of a block adjacent to the block including the target pixel, calculates a frequency of a pixel value that depends on a pixel position in the block of the target pixel, and generates a third histogram formed by N bins for each pixel; and
an output value determination portion that generates a relationship between the pixel value and an output value of the pixel value based on the third histogram such that a maximum cumulative frequency of the third histogram matches a maximum value of the output value of the pixel value, and calculates the output value from the pixel value of the target pixel.

2. The image processing device according to claim 1, wherein the block histogram generation portion applies weighting to the frequency in accordance with the pixel value.

3. The image processing device according to claim 2, wherein the block histogram generation portion adds, in accordance with the pixel value, the frequency to a bin adjacent to a bin including the pixel value.

4. The image processing device according to claim 1, wherein the pixel histogram generation portion mixes the second histogram of the block including the target pixel and the second histogram of the block adjacent to the block including the target pixel, by normalizing the second histograms by a distance between the target pixel and a center of the adjacent block, and generates the third histogram.

5. The image processing device according to claim 1, wherein the relationship between the pixel value and the output value of the pixel value is obtained by connecting lines, each of which is formed by connecting a frequency of a minimum pixel value of one bin width to a frequency of a maximum pixel value of one bin width.

6. An image processing method comprising the steps of:
calculating a frequency of a pixel value for each of blocks formed of a plurality of pixels, dividing a dynamic range into N ranges (where N is an integer larger than one), and generating a first histogram formed by N bins in which a width of one bin corresponds to a plurality of pixel values;
extracting the first histogram of a high luminance block formed by pixels having a high luminance value from among the plurality of blocks of an entire image;
mixing the first histogram of each of the blocks and the first histogram of the high luminance block, and generating a second histogram for each of the blocks;
calculating, based on the second histogram of a block including a target pixel and the second histogram of a block adjacent to the block including the target pixel, a frequency of a pixel value that depends on a pixel position in the block of the target pixel, and generating a third histogram formed by N bins for each pixel; and
generating a relationship between the pixel value and an output value of the pixel value based on the third histogram such that a maximum cumulative frequency of the third histogram matches a maximum value of the output value of the pixel value, and calculating the output value from the pixel value of the target pixel.

7. A non-transitory computer-readable medium having stored thereon a computer-readable program that comprises instructions that command a computer to function as:
a first histogram generation unit that calculates a frequency of a pixel value for each of blocks formed of a plurality of pixels, divides a dynamic range into N ranges (where N is an integer larger than one), and generates a first histogram formed by N bins in which a width of one bin corresponds to a plurality of pixel values;
an extraction unit that extracts the first histogram of a high luminance block formed by pixels having a high luminance value from among the plurality of blocks of an entire image;
a second histogram generation unit that mixes the first histogram of each of the blocks and the first histogram of the high luminance block, and generates a second histogram for each of the blocks;
a third histogram generation unit that, based on the second histogram of a block including a target pixel and the second histogram of a block adjacent to the block including the target pixel, calculates a frequency of a pixel value that depends on a pixel position in the block of the target pixel, and generates a third histogram formed by N bins for each pixel; and an output value determination unit that generates a relationship between the pixel value and an output value of the pixel value based on the third histogram such that a maximum cumulative frequency of the third histogram matches a maximum value of the output value of the pixel value, and calculates the output value from the pixel value of the target pixel.

* * * * *